United States Patent [19]

Burghardt et al.

[11] 4,186,895

[45] Feb. 5, 1980

[54] SAFETY BELT RETRACTOR

[75] Inventors: Wilfried Burghardt, Prittlbach; Rolf Vogel, Althegnenberg; Ludwig Zauser, Gernlinden, all of Fed. Rep. of Germany

[73] Assignee: Hans Kolb GmbH & Co., Grossberghofen, Fed. Rep. of Germany

[21] Appl. No.: 926,620

[22] Filed: Jul. 21, 1978

[30] Foreign Application Priority Data

Jul. 21, 1977 [DE] Fed. Rep. of Germany ....... 2733008

[51] Int. Cl.$^2$ ...................... A62B 35/02; B65H 75/48
[52] U.S. Cl. ...................... 242/107.4 B; 242/107.4 A
[58] Field of Search ................. 242/107.4 R–107.4 E; 297/388; 280/744–747

[56] References Cited

U.S. PATENT DOCUMENTS

| 3,851,835 | 12/1974 | Fohl ............................... 242/107.4 B |
| 4,077,585 | 3/1978 | Wiesbock ....................... 242/107.4 B |

FOREIGN PATENT DOCUMENTS

2534362  2/1977  Fed. Rep. of Germany ... 242/107.4 A

*Primary Examiner*—John M. Jillions
*Attorney, Agent, or Firm*—Stevens, Davis, Miller & Mosher

[57] ABSTRACT

A device for rolling up a belt of a safety belt assembly for automobiles or the like of the kind employing a locking wheel on the reel spindle for the belt. The locking wheel is moved axially into engagement with a set of teeth on the housing to stop the reel spindle rotatably mounted in said housing. A locking member on the locking wheel first engages another set of teeth on the housing in response to accelerations of the belt in the withdrawal direction to bring the locking wheel to a stop in one of a limited number of known angular positions, whereupon it is moved axially to engage the first mentioned housing teeth with no risk of those teeth coming into tip-to-tip engagement. The locking member may be an inertia body and/or acted on by a separate inertia body, which may be a ring. The locking wheel may be in two parts, only one of which moves axially, and there may also be a locking responsive to accelerations of the automobile or the like which, using the two-part locking wheel, still allows the device to be mounted in an inclined attitude.

38 Claims, 6 Drawing Figures

SAFETY BELT RETRACTOR

The invention relates to means for retracting the belt of safety belts, in particular for motor vehicles, of the kind stated in the introductory part of the main claim.

A substantial number of devices for retracting the belt of safety belts are already known, and they differ from one another mainly in the manner in which the belt is locked against withdrawal and the measures associated with it. The locking of the belt is in response to movement of the belt and/or to movement of te vehicle. In belt-responsive working methods the withdrawal of the belt from the device in question is locked at a predetermined belt acceleration of, for example, 1 g, and in vehicle-responsive methods of operation it is locked when the vehicle on which the device in question is mounted experiences a predetermined acceleration in any direction, for example of 0.4 g.

Both for belt-responsive and also vehicle-responsive locking of the belt in the withdrawal direction it is known to provide a ratchet wheel with lateral teeth, which is mounted on one end of the spindle for the reel carrying the belt and is axially movable and rotatable with respect to the reel, that is to say is screwed on it, for example by means of an internal screw thread on the wheel and a corresponding external thread on the adjacent end of the spindle; the laterally placed teeth on the wheel cooperating with teeth secured to a housing. In the rest condition these teeth are out of engagement and so the belt can be withdrawn from the device in question, the reel spindle and the ratchet wheel rotating together without any relative movement taking place. This movement only takes place on a predetermined acceleration of the belt or of the vehicle.

In belt-responsive methods of operation one makes use of the moment of inertia of the wheel itself. When the belt is withdrawn at a belt acceleration of, for example, 1 g then the reel spindle rotates relative to the heavy ratchet wheel and so the latter is screwed along so that the teeth on the side of it come into engagement with the teeth on the housing, preventing further rotation of the reel spindle and halting withdrawal of the belt.

In vehicle-responsive methods of operation the ratchet wheel has additional peripheral teeth which cooperate with a detent member which is moved by an inertia body. On a predetermined vehicle acceleration of, for example, 0.4 g the inertia body moves the detent into engagement with the teeth on the periphery of the wheel, locking it against rotation and on slight further rotation of the reel spindle by withdrawal of the associated belt it moves axially to bring the teeth on its side face into engagement with the fixed teeth in the housing so as to prevent further rotation of the spindle and to halt the withdrawal of the belt.

The ratchet wheel is urged by a spring into its rest position in which the side teeth are out of engagement with the associated teeth on the housing. As a rule, at the end which is furthest from the ratchet wheel, the spindle is provided with at least one spring which urges the spindle in the winding-up direction. Not only are devices known with such a ratchet wheel which operates in the stated manner in response to belt acceleration and devices responding to vehicle acceleration but also there are those which respond both to belt acceleration and also to vehicle acceleration. Favoured above all in these devices is the fact that on mutual engagement of the lateral teeth on the wheel and the corresponding teeth on the housing relatively large forces can be transmitted and a relatively large-area and symmetrical mutual engagement is obtained.

However in such devices with belt-responsive locking of the belt there is the danger that on response, that is to say on movement of the ratchet wheel in relation to the reel spindle, the side teeth on the wheel and the associated teeth on the housing happen to come to a halt tooth-to-tooth i.e. with the tips of the teeth opposite one another. Because of the high surface loads this has generally lead to destruction of the teeth of one or both sets so that the device as a whole can no longer be used.

The invention is based on solving the problem of providing a device of the kind stated in the introductory part of the main claim in which in particular this drawback is avoided. Advantageous further features of the invention are identified in the remaining claims.

In the device according to the invention it is advantageously achieved that the side teeth on the ratchet wheel always engage the associated teeth on the housing and these two sets of teeth can no longer come into tooth to tooth relationship. On predetermined acceleration of the belt in the withdrawal direction, the locking member provided on the wheel moves into engagement with the associated teeth on the housing so that a predetermined rotary position of the wheel with reference to the housing and accordingly with respect to those teeth is defined, with which the side teeth on the wheel co-operate. When the wheel now moves axially to bring its lateral teeth towards the corresponding teeth on the housing then effective and complete mutual engagement is achieved when only these two sets of teeth are appropriately arranged relative to one another.

By corresponding adjustment of the relative mutual positions of the locking member for the wheel, the associated teeth on the housing, the side teeth on the wheel and the associated fixed teeth on the housing, there is likewise achieved an effective belt-responsive manner of operation of the apparatus or likewise a vehicle-responsive method of operation, which can be provided in addition and in which the wheel has additional peripheral teeth which co-operate with a locking member actuated by an inertia body.

The locking member on the ratchet wheel can itself be in the form of an inertia body and/or, for movement from the rest position into the engaged position, connected to a separate inertia body provided on the ratchet wheel. Preferably the separate body is in the form of a ring which is arranged to be co-axial with the wheel and is rotatably mounted on it. In this way there is the particular advantage that the device operates independently of attitude as the centre of gravity of the components that move in response to belt movement lie on the axis of rotation.

The ratchet wheel can be made either in one part or in two. The two-part version with a control disc which carries the locking member and with a locking disc which has the teeth on the side of it and is capable of a screw movement with respect to the reel spindle, allows in particular also a particularly favourable engagement of the side teeth in the associated teeth fixed to the housing, with the greatest possible relief of load on the locking member and indeed especially if the side teeth are formed by block-shaped projections and the associated teeth on the housing are formed by corresponding openings of larger cross-section. In addition the two-part construction of the ratchet wheel has the advantage that the apparatus can also be incorporated in the version with vehicle-responsive operation, independent of attitude, that is to say it does not always have to have the axis of rotation of the reel and the ratchet wheel substantially horizontal.

Mounting in an inclined position is often desirable in view of the space available; in known constructions, however, it is not possible because, bearing in mind the angle between the inclined ratchet wheel and the perpendicularly directed locking member that co-operates with the peripheral teeth on the one-piece ratchet wheel, the pressure of the ratchet wheel on the locking member can push the latter back or indeed break it and/or the wheel can, in its axial movement, run clear of the locking member. These dangers are particularly great in a pawl-like locking member which can pivot about a horizontal axis on the housing and rests on an inertia body in the form of a ball, so as to pivot into engagement with the peripheral teeth on the wheel on movement of the ball in a saucer in the event of substantial horizontal accelerations of the vehicle. The two-part construction of the ratchet wheel according to the invention avoids these drawbacks. It is possible and advantageous both in devices which are both belt-responsive and vehicle-responsive and also in those which are solely vehicle-responsive.

Three embodiments of the device according to the invention are described in the following by way of example with reference to the drawings in which, shown diagrammatically.

The apparatus comprises a housing 1 in which there is rotatably mounted a reel spindle 2 carrying a rolled-up belt 3. The belt 4 wound on to the reel is secured to the spindle 2 at one end and its other end extends out of the housing 1 as shown in FIG. 1.

Figure 1:
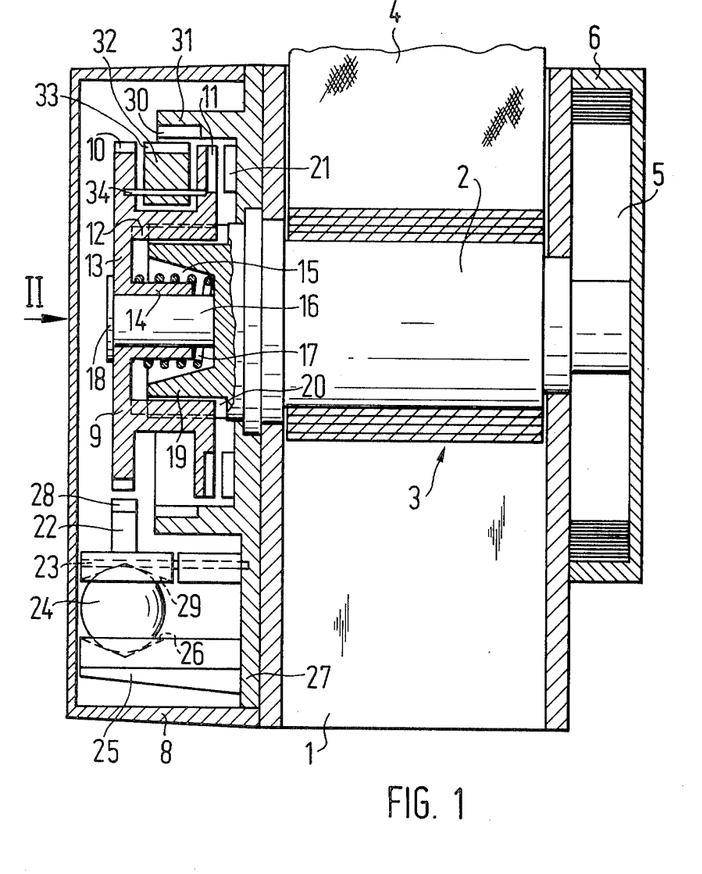
FIG. 1 is a longitudinal section through a first embodiment in a plane containing the axis of rotation of the reel spindle.

A spiral spring 5, which has as far as possible a flat spring characteristic, engages one end of the spindle 2, namely the right-hand end as viewed in FIG. 1, having its inner end secured to the spindle 2 and its outer end secured to a cover 6 mounted on the housing 1. When the belt 4 is drawn out of the housing 1 when the safety belt is used, rotating the spindle 2 in the direction of the arrow 7 (FIGS. 2, 3, 5 and 6), the spiral spring 5 is stressed, but the spring force acting on the spindle 2 rises only slightly, in view of the flat spring characteristic of the spring 5. When the safety belt is released, the belt 4 is automatically drawn into the housing 1 and rolled up on the spindle 2 under the action of the spiral spring 5 which drives the spindle 2 in the direction opposite the arrow 7.

Provided on the other end of the spindle 2 is a ratchet wheel 9 with teeth 10 around its periphery and also with teeth 11 on its side face and an internal screw thread 12. As shown in FIG. 1 the wheel 9 is mounted within a cover 8 secured to the housing 1. Whilst in the embodiments shown in FIGS. 1 to 3 the wheel 9 is made in one piece, in the third embodiment illustrated in FIGS. 4 to 6 it is made up of two parts. As shown in FIG. 4 the wheel 9 comprises a round control disc 9a and a round locking disc 9b. The control disc 9a is provided with peripheral teeth 10 and the locking disc 9b is provided with teeth 11 on its side face and with the internal screw thread 12. The control disc 9a and the locking disc 9b are connected together substantially securely against relative rotation but are axially movable relative to one another, as explained later.

The wheel 9 or the locking disc 9b carries on that face which is opposite the teeth 11 and the spindle 2 a plate-like portion 13 which leads to a central hollow pin 14. The latter extends into a recess 15 in the adjacent face of the spindle 2 and is slidably guided on an axial projection 16 of the spindle 2. Mounted in the recess 15 is a compression spring 17 which surrounds the hollow pin 14 and abuts on the one hand against the spindle 2 and on the other hand against the wheel 9 or locking disc 9b, in fact internally against the cover-shaped portion 13. At its free end the projection 16 or a portion 16a of reduced diameter is provided with a head 18. In the two embodiments shown in FIGS. 1 to 3 the spring 17 urges the one-piece ratchet wheel 9 against the head 18, as shown in FIG. 1. In the third embodiment shown in FIGS. 4 to 6 the head 18 holds the control disc 9a on the portion 16a of the projection 16 and the spring 17 urges the locking disc 9b against the control disc 9a which is rotatably mounted by a hollow pin 14a on the portion 16a, as shown in FIG. 4.

The reel spindle 2 has a sleeve-shaped portion 19 extending into the wheel 9 or the locking disc 9b. Provided on the portion 19 is an external screw thread 20 which cooperates with the internal thread 12 on the wheel 9 or disc 9b. Opposite its side teeth 11 there is provided a corresponding set of teeth 21 secured to the housing. The two sets of teeth 11 and 21 co-operate, as explained further below and are out of engagement when the wheel 9 engages the head 18 of the axial projection 16 of the spindle 2 or when the locking disc 9b engages the control disc 9a.

In order to obtain vehicle-responsive locking of the belt 4 in the withdrawal direction there is provided, as shown in FIGS. 1 to 4, below the wheel 9 or the control disc 9a a pawl-like locking member 22 pivotally mounted about a horizontal axis 23 in the housing 1. The member 22 rests on an inertia body 24 which is in the form of a ball and which is mounted in a saucer 25 with a conical floor 26 secured to the housing 1. The saucer 25 is formed of synthetic resin on a component 27 secured to the housing, like the teeth 21 secured to the housing. The tooth shaped projection 28 on the locking member 22 co-operates with the teeth 10 on the periphery of the wheel 9 or the control disc 9a, as explained below, and has a conical recess 29 by which it rests on the inertia body 24. In FIG. 4 only the tooth-shaped projection 28 of the locking member 22 is illustrated.

Further teeth 30 are provided, fixed to the housing, extending around the wheel 9 and on the inside of a cylindrical lateral projection 31 of the component 27 fixed to the housing, the teeth being formed of synthetic resin. A locking member 32 on the wheel 9 co-operates with them in a manner to be explained later.

Figure 2:
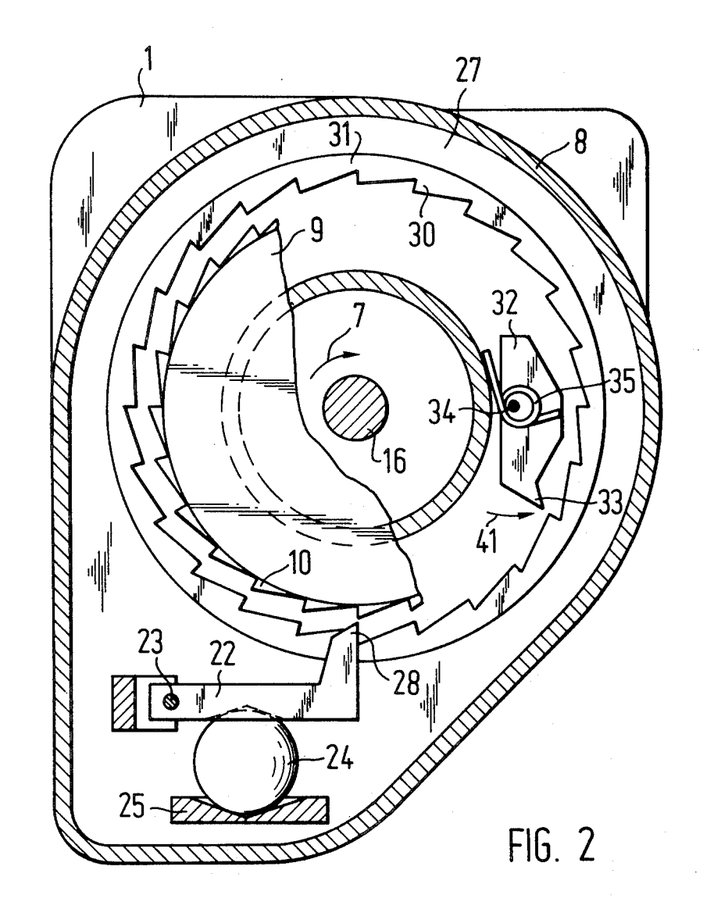
FIG. 2 is a side view looking in the direction of the arrow II in FIG. 1, the nearer cover of the housing and a part of the ratchet wheel being broken away and some of the components being shown in section, and the ratchet wheel furthermore being shown in a different angular position.
Figure 3:
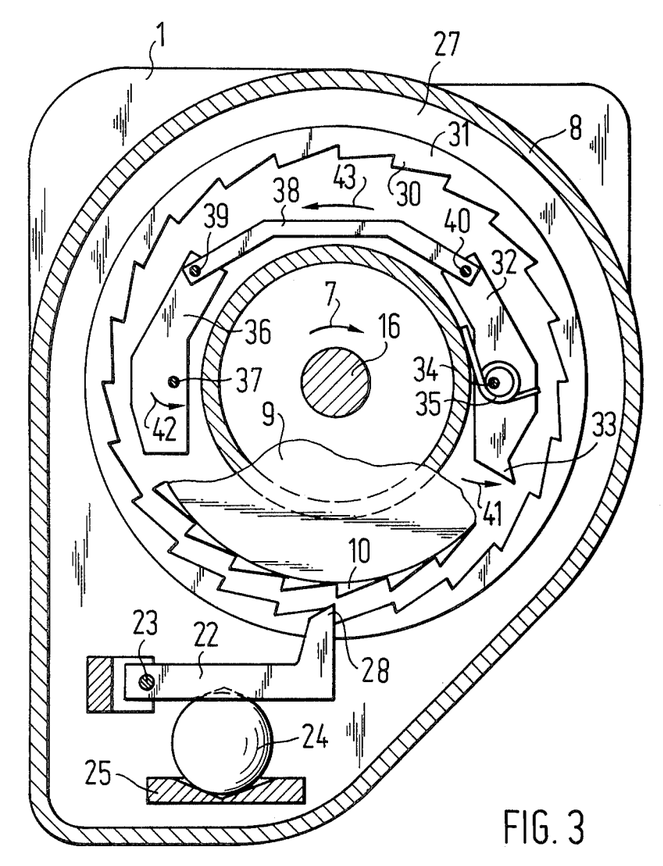
FIG. 3 shows a side view, corresponding to FIG. 2, of a second embodiment.
Figure 4:
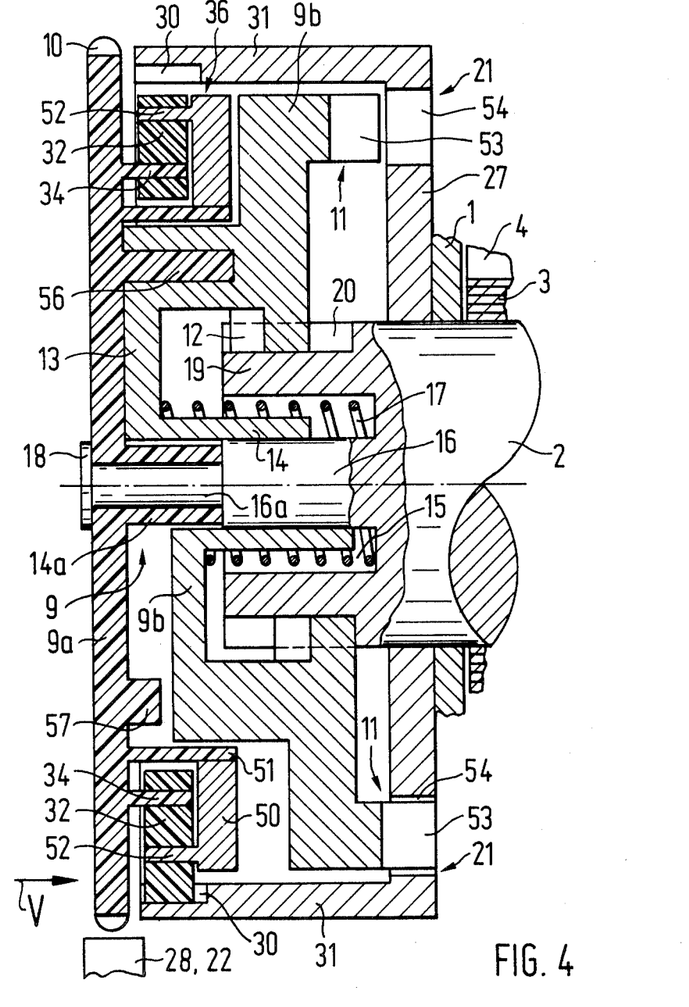
FIG. 4 shows a part of a longitudinal section, corresponding to FIG. 1, to a larger scale and illustrating a third embodiment with the upper and lower halves illustrated in different conditions.

In the two embodiments in FIGS. 1 to 3 the locking member 32 is in the form of a locking detent having a tooth shaped projection 33 and pivotably mounted on the one-piece locking wheel 9 about an axis 34 parallel to the axis of rotation of the spindle 2, and it is urged by a spring 35 (FIGS. 2 and 3) into the position shown, in which the tooth shaped projection 33 is out of engagement with the teeth 30 on the housing. The locking detent 32 can be provided with an abutment stop, not illustrated, that engages the one-piece ratchet wheel 9.

The embodiment shown in FIG. 3 differs from that of FIGS. 1 and 2 only in that, in addition to the locking detent 32, a further inertia body 36 is mounted on the one-piece ratchet wheel 9, to pivot about an axis 37 parallel to the axis 34 of the detent 32. The body 36 lies substantially diametrically opposite the detent 32 so that therefore the two axes 34 and 37 lie on substantially the same diameter on opposite sides of the axial projection 16 of the spindle 2. The body 36 is connected to the detent 32 by a link 38 pivotally connected to the body 36 at 39 and to the detent 32 at 40. The body 36 reinforces the operation of the locking detent 32 and achieves in particular a substantially constant sensitivity of response of the locking detent 32 independently of its position in different angular positions of the one-piece wheel 9. Furthermore the use of the additional inertia body 36 makes it possible to reduce the mass of the locking detent 32 and of reducing its dimensions correspondingly, so that the space occupied is reduced.

In the rest position shown in FIGS. 1 to 3 the inertia body 24 occupies its lowest position in the saucer 25, and also fits into the conical reccess 29 in the locking member 22. The member 22 is out of engagement with the wheel 9. Similarly the locking detent 32 on the one-piece wheel 9 is held by the spring 35 out of engagement with the teeth 30 on the housing. The wheel 9 has its side teeth 11 clear of the associated teeth 21 on the housing, being urged by the compression spring 17 against the head 18 of the axial projection 16 of the spindle 2. The spindle 2 is therefore freely rotatable in the housing 1 together with the one-piece ratchet wheel 9.

On relative acceleration between the inertia body 24 and the saucer 25, originating from a corresponding acceleration of the vehicle to which the device is fitted, the inertia body 24 moves away from its lowest position in the saucer 25. The result of this is that the locking member 22 is pivoted to cause its tooth shaped projection 28 to come into engagement with the teeth 10 on the periphery of the one-piece wheel 9, thereby locking the wheel 9 against rotation in the direction of the arrow 7. However as a result of the tension exerted on the belt 4 the spindle 2 is rotated in the direction of the arrow 7 so that the one-piece wheel 9 is screwed along the spindle 2 against the action of the spring 17 until the side teeth 11 come into engagement with the teeth 21 on the housing. Further withdrawal of the belt from the housing 1 is thus prevented.

In the belt-responsive mode of operation which is possible in addition to this vehicle-responsive mode, the locking detent 32 is effective. When the wheel 9 is accelerated in the circumferential direction in such a way that the acceleration exceeds a predetermined threshold value, for example of 1 g, then by virtue of the mass of the detent 32 and its disposition on the wheel 9, the detent 32 pivots in the direction of the arrow 41 (FIGS. 2 and 3) against the action of the spring 35 until its toothed projection 33 engages the associated teeth 30 mounted on the housing. In this way the one-piece wheel 9 (just as in vehicle-responsive operation by the locking member 22) is locked in a predetermined angular position with reference to the housing 1 and its teeth 21. Just as in the vehicle-responsive belt locking in the direction of withdrawal, the one-piece wheel 9 moves, on a subsequent further rotation of the spindle 2 in the direction of the arrow 7, effected by the tension exerted on the belt 4, against the action of the spring 17 to bring its side teeth 11 against the associated teeth 21 on the housing in order to come into engagement thereby and halt the withdrawal of the belt from the housing 1.

Therefore also in this belt-responsive mode the angular position of the one-piece wheel 9 with reference to the housing 1 and accordingly with reference to the teeth 21, when which the wheel 9 is displaced axially, is defined exactly. The side teeth 11 on the one-piece wheel 9 and the associated teeth 21 on the housing are arranged so that on the said axial movement of the wheel 9 a trouble-free mutual engagement is obtained. The two sets of teeth 11 and 21 can therefore not come into a tooth to tooth position in the belt-responsive mode either.

In the embodiment shown in FIG. 3, in the event of the stated acceleration in the direction of the arrow 7, the inertia body 36, in view of its heavy mass and its placing on the wheel 9, pivots in the direction of the arrow 42, which leads to movement of the link 38 in the direction of the arrow 43 and produces or assists the movement of the locking detent 32 in the direction of the arrow 41.

Figure 5:
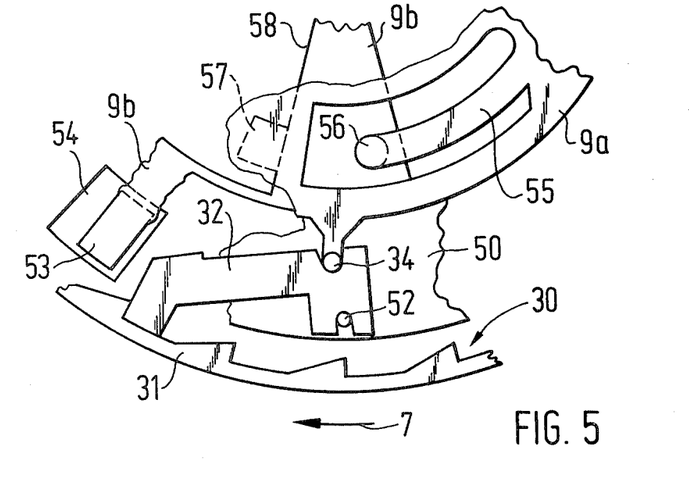
FIG. 5 is a partial side view looking in the direction of the arrow V in FIG. 4, illustrating only part of the nearer control disc and the locking disc behind it, of the ratchet wheel, and the ring lying between them and serving as an inertia body for movement of the locking member against the control disc.
Figure 6:
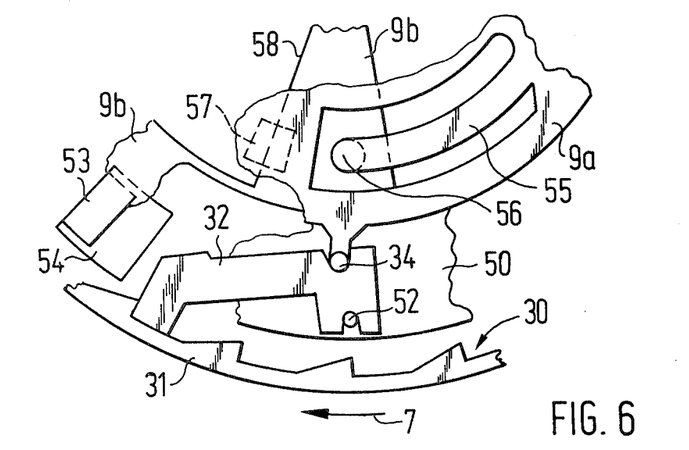
FIG. 6 is a side view corresponding to FIG. 5 but after slight resilient rotation of the locking disc behind in a clockwise direction from the position shown in FIG. 5.

As explained, in the third embodiment shown in FIGS. 4 to 6 the wheel 9 is made up of a control disc 9a and a locking disc 9b. The locking member 32, again in the form of a locking detent, is mounted on the control disc 9a to pivot about the axis 34. The inertia body 36 for moving the detent 32 from its rest position into engagement with the teeth 30 on the housing is in the form of a ring 50 arranged co-axial with the disc 9a and rotatably mounted on a sleeve-like axial extension 51 of it. Provided between the control disc 9a and the ring 50 there is a compression spring, not shown, which urges the control disc 9a circumferentially in such a direction that the locking detent 32 is pivoted towards its rest position. The detent 32 is pivotably connected to the ring 50 about an axis 52 parallel to the axis 34. The two axes 34 and 52 are arranged spaced apart in such a way that on rotation of the disc 9a in the direction of the arrow 7 with respect to the ring 50 against the action of the interposed spring the detent 32 is pivoted out of the rest position and into the engaged position as shown in FIGS. 5 and 6.

The teeth 11 on the side face of the locking disc 9b are formed by block-shaped projections 53, distributed uniformly in a circumferential direction, with a substantially rectangular cross-section as shown in FIGS. 5 and 6. The associated teeth 21 on the housing are formed by correspondingly circumferentially spaced openings 54 of a larger cross-section, likewise substantially rectangular as shown in FIGS. 5 and 6.

As can clearly be seen in FIGS. 5 and 6, spring arms 55 are provided on the control disc 9a and each has at its free end a pin 56 parallel to the spindle 2 and engaging in a corresponding bore in the locking disc 9b, as can be seen in the upper half of FIG. 4. In this way the control disc 9a and the locking disc 9b are free for relative axial movement but are keyed together substantially against any relative angular movement. The spring arms 55 only allow a minimum relative angular movement.

In addition the control disc 9a has on the same side as the disc 9b peg-like projections 57 which co-operate respectively with edges 58 of corresponding openings in the locking disc 9b, as explained further below.

The embodiments shown in FIGS. 4 to 6 operates as follows. As in the two embodiments of FIGS. 1 to 3, in the vehicle-responsive mode of operation the locking member 22 acts whilst with belt-responsive operation the locking detent 32 is effective, in order to hold the control disc 9a in a defined angular position with reference to the teeth 21 on the housing. The locking detent 32 pivots into engagement with the associated teeth 30 on the housing because the ring 50, on account of its own heavy mass, lags behind the control disc 9a when the latter moves suddenly in the direction of the arrow 7 (FIGS. 5 and 6) on sudden withdrawal of the belt 4 from the reel spindle 2. As the spindle 2 is then rotated further in the direction of the arrow 7 its screwed connection with the locking disc 9b, which is held by the control disc 9a, causes the disc 9b to move axially away from the control disc 9a against the action of the spring 17 so that its projections 53 enter the openings 54 as shown in FIG. 5. As soon as the edges of the openings 58 in the locking disc 9b have moved clear of the co-operating projections 57, the locking disc 9b can rotate further in the direction of the arrow 7 by virtue of the resilient connection to the control disc 9a through the spring arm 55, to allow the projections 53 on the disc 9a to engage the corresponding side edges of the associated openings 54, as shown in FIG. 6, so that any further rotation of the spindle 2 in the direction of the arrow 7 is prevented, the torque exerted on the spindle 2 through the locking disc 9b on the housing 1 or the component 27 secured to it being transmitted through the projections 53 which engage in the openings 54. The detent 32 is completely relieved of this force transmission.

In the upper half of FIG. 4 the device is shown in the condition in which the detent 32 is in its rest position and the locking disc 9b is not operated, whilst in the lower half it is shown in the condition in which the detent 32 is in its engaged position and the locking disc 9b is axially displaced, the locking detent 32 being shown in both cases although in practice only one locking detent 32 is provided. Also in FIGS. 5 and 6 there is shown the resilient relative movement of the locking disc 9b and the control disc 9a in the peripheral direction, shown exaggerated in the interests of a clearer understanding.

FIG. 4 shows in particular that the two-part form of the locking wheel 9 makes it possible to arrange the locking member 22 also at an inclination with respect to the plane of the control disc 9a without adversely affecting the advantageous vehicle-responsive manner of operation as on locking the control disc 9a does not move axially but only the locking disc 9b. This means that the device does not have to be mounted with the spindle 2 substantially horizontal, as shown, but could also be mounted with the spindle 2 inclined.

The belt-responsive locking of the belt in the direction of withdrawal takes place for example when the vehicle-responsive locking of the belt in the withdrawal direction is not possible, basically because the locking member 22 is broken or an otherwise necessary component for it is missing. The sensitivity of response of the device according to the invention with belt-responsive locking of the belt in the withdrawal direction lies preferably between about 1.2 and 1.5 g for reasons of convenience when the user is fitting the seat belt.

In the embodiment illustrated the teeth 30 secured to the housing and co-operating with the locking detent 32 on the wheel 9 or the control disc 9a preferably have the same tooth spacing as the other teeth 21 fixed to the housing. The side teeth 11 correspond to this. The tooth spacing of the peripheral teeth 10 of the wheel 9 or control disc 9a with which the locking membe 22 co-operate in the vehicle-responsive mode likewise corresponds to that of the fixed teeth 21. Differing from the embodiments illustrated and described, the peripheral teeth 10 could also be provided externally on a pot-shaped cover which is secured to or formed with the wheel 9 or control disc 9a and encloses with its cylindrical side wall the cylindrical lateral projection 31 of the component 27 secured to the housing so that all the components for locking the reel spindle 2 are formed as a unit, apart from the peripheral teeth 10 of the wheel 9 or control disc 9a, the locking member 22, that co-operates with it, the inertia body 24 for actuating it and the saucer 25 that receives the inertia body 24.

From the manner of operation of the device according to the invention as described it follows that it is not dependent on the heavy mass of the locking wheel 9. The wheel 9 can accordingly be made of light construction. This construction as a component of as little mass as possible is the preferred one.

Further departures are also possible from the embodiments illustrated and described. For example it is not absolutely essential that the axial displacement of the wheel 9 or of the locking disc 9b on the axial extension 16 of the spindle 2 on relative rotation of the locking wheel 9 or locking disc 9b and the reel spindle 2 should be provided by an internal thread 12 and an external thread 20. The only thing that is important is that there should be inclined control surfaces acting between the wheel 9 or locking disc 9b and the spindle 2 so that the stated axial movement of the wheel 9 or locking disc 9b takes place.

Also in the embodiment of FIGS. 4 to 6 with a two-part ratchet wheel 9, instead of the connection between the control disc 9a and locking disc 9b which has a certain degree of circumferential resilience, a kind of screw connection can be provided, in which the axial pegs 56 are arranged rigidly on the control disc and are of conical form, converging away from the control disc 9a in order to co-operate with respective edges of openings in the locking disc 9b, similar to the projections 57, which co-operate with the edges of openings 58 and which could also be present in the modification described in order to permit the slight rotation of the locking disc 9b for mutual engagement of the block-like projections 53 and the openings 54 according to FIG. 6 only about the end of the axial movement of the locking disc 9b away from the control disc 9a. Instead of the projections 57, for this purpose in the modification in question, however, the pegs 56 could each only be of conical form over the end portion furthest from the control disc 9a.

Basically only spring arm 55 or peg 56 is neccessary, likewise only one peg-like projection 57 may be provided, if necessary. Advantageously, however a number of such members are provided, distributed circumferentially.

We claim:

1. A device for rolling up a belt of a safety belt assembly for automobiles and the like, said device comprising:
   (a) a housing,
   (b) a reel spindle for said belt, said reel spindle being rotatably mounted in said housing,
   (c) a first spring means urging said reel spindle in belt rolling-up direction, and
   (d) means for locking said reel spindle in said housing against rotation in the belt withdrawal direction in response to a sudden movement of the belt in said withdrawal direction, said locking means comprising:
   (e) a locking wheel provided with lateral teeth and having a screw engagement with said reel spindle,
   (f) first teeth on said housing facing said lateral locking wheel teeth,
   (g) a second spring means urging said locking wheel into a rest position in which said lateral locking wheel teeth are out of engagement with said first housing teeth,
   (h) second teeth on said housing,
   (i) a locking member movably mounted on said locking wheel adjacent to said second housing teeth,
   (j) a third spring means urging said locking member into a rest position out of engagement with said second housing teeth, and
   (k) means for moving said locking member from said rest position into engagement with said second housing teeth to stop said locking wheel positively in a predetermined angular position with respect to said first housing teeth,
   said locking member moving means being responsive to a predetermined acceleration of said locking wheel by said reel spindle upon said sudden movement of the belt in the withdrawal direction, and
   said mutual screw engagement of said locking wheel and said reel spindle driving said stopped locking wheel axially by further rotation of said reel spindle in said belt withdrawal direction for engagement of said lateral locking wheel teeth with said first housing teeth to obtain said reel spindle locking in said housing.

2. The device according to claim 1, wherein said locking member moving means comprises the mass inertia of said locking member.

3. The device according to claim 2, wherein said locking member is a locking detent pivotally mounted on said locking wheel.

4. The device according to claim 1, wherein said locking member moving means comprises an inertia body movably mounted on said locking wheel and connected to said locking member to move it from said rest position into said engaged position.

5. The device according to claim 4, wherein said locking member is a locking detent pivotally mounted on said locking wheel, and wherein furthermore said inertia body is mounted pivotally on the locking wheel and is arranged substantially diametrically opposite said locking detent, said inertia body and said locking detent being connected by a link.

6. The device according to claim 5, wherein said locking member moving means comprises the mass inertia of said locking detent itself in addition to said inertia body.

7. The device according to claim 4, wherein said inertia body is a ring co-axial with said locking wheel and rotatably moounted on the locking wheel.

8. The device according to claim 7, wherein said locking member is a locking detent rotatably mounted on the one hand on said locking wheel and on the other hand on said ring about two spaced axes parallel to the common axis of rotation of the locking wheel and the ring.

9. The device according to claim 7, wherein said ring is spring-urged into an angular position in relation to said locking wheel in which angular position said locking member is in said rest position.

10. The device according to claim 1, wherein said first housing teeth and said second housing teeth have the same tooth spacing.

11. The device according to claim 1, wherein said locking wheel has a relatively low inertial mass.

12. The device according to claim 1 also comprising:
   (l) peripheral teeth on said locking wheel,
   (m) an additional locking member movably mounted on said housing, and
   (n) an additional inertia body responding to predetermined accelerations of said automobile or the like for moving said further locking member into engagement with said peripheral locking wheel teeth to stop said locking wheel positively in a predetermined angular position with respect to said first housing teeth.

13. The device according to claim 1, wherein said peripheral locking wheel teeth are provided on the outside of a pot-shaped cover portion of said locking wheel which portion encloses said first housing teeth, said second housing teeth, said lateral locking wheel teeth, said locking member or detent on the locking wheel and, where present, the separate inertia body on the locking wheel.

14. The device according to claim 1, wherein said first housing teeth and said peripheral locking wheel teeth have the same tooth spacing.

15. A device for rolling up a belt of a safety belt assembly for automobiles or the like, said device including:
   (a) a housing,
   (b) a reel spindle for said belt, said reel spindle being rotatably mounted in said housing,
   (c) a first spring means urging said reel spindle in belt rolling-up direction, and
   (d) means for locking said reel spindle in said housing against rotation in belt withdrawal direction in response to a sudden movement of the belt in said withdrawal direction, said locking means comprising:
   (e) a locking wheel consisting of two parts and including a control disc and a locking disc being provided with lateral teeth and having a screw engagement with said reel spindle and a hollow hub slidably mounted on a supporting portion of the reel spindle, whereas said control disc is rotatable with respect to the reel spindle but axially fixed, said locking disc being axially movable with respect to the control disc, but connected for substantial rotation with the control disc, (f) first teeth on said housing facing said lateral locking disc teeth, (g) a second spring means urging said locking disc into a rest position in which said lateral locking disc teeth are out of engagement with said first housing teeth, (h) second teeth on said housing, (i) a locking member movably mounted on said control disc adjacent to said second housing teeth, (j) a third spring means urging said locking member into a rest position out of engagement with said second housing teeth, and (k) means for moving said locking member from said rest position into engagement with said second housing teeth to stop said control disc positively in a predetermined angular position with respect to said first housing teeth, said locking member moving means being responsive to a predetermined acceleration of said control disc by said reel spindle upon said sudden movement of the belt in withdrawal direction, and said mutual screw engagement of said locking disc and said reel spindle driving the locking disc guided by said stopped control disc axially by further rotation of said reel spindle in said belt withdrawal direction for engagement of said lateral locking disc teeth with said first housing teeth to obtain said reel spindle locking in said housing.

16. The device according to claim 15, wherein said control disc and said locking disc are connected together resiliently in circumferential direction.

17. The device according to claim 16, wherein said control disc comprises at least one spring arm to engage said locking disc.

18. The device according to claim 16, comprising stops between said control disc and said locking disc for locking the relative resilient movement in said circumferential direction until the locking disc moves a predetermined distance axially away from the control disc.

19. The device according to claim 18, wherein said stops are formed by at least one peg-shaped projection on said control disc and a cooperating edge of an opening in said locking disc.

20. The device according to claim 15, wherein said control disc and said locking disc are connected together against rotation by means of at least one conical axial peg so that the locking disc, on axial movement away from the control disc, turns to a limited extent with respect to the control disc.

21. The device according to claim 20, comprising stops between said control disc and said locking disc for locking the relative turning movement until the locking disc moves a predetermined distance axially away from the control disc.

22. The device according to claim 21, wherein said stops are formed by at least one peg-shaped projection on said control disc and a cooperating edge of an opening in said locking disc.

23. The device according to claim 15, wherein said lateral locking disc teeth are formed by circumferentially uniformly spaced block-like projections, and said first housing teeth are formed by correspondingly circumferentially spaced openings of larger cross-section.

24. The device according to claim 15, wherein said locking member moving means comprises the mass inertia of said locking member.

25. The device according to claim 24, wherein said locking member is a locking detent pivotally mounted on said control disc.

26. The device according to claim 15, wherein said locking member moving means comprises an inertia body movably mounted on said control disc and connected to said locking member to move it from said rest position into said engaged position.

27. The device according to claim 26, wherein said locking member is a locking detent pivotally mounted on said control disc, and wherein said inertia body is mounted pivotally on the control disc and is arranged substantially diametrically opposite said locking detent and a link connects said inertia body and said locking detent with each other.

28. The device according to claim 27, wherein said locking member moving means comprises the mass inertia of said locking detent in addition to said inertia body.

29. The device according to claim 15, wherein said locking member moving means comprises an inertia ring co-axial with said control disc and rotatably mounted on the control disc and connected to said locking member to move it from said rest position into said engaged position.

30. The device according to claim 29, wherein said locking member is a locking detent rotatably mounted on the one hand on said control disc and on the other hand on said inertia ring about two spaced axes parallel to the common axis of rotation of the control disc and the inertia ring.

31. The device according to claim 29, wherein said inertia ring is spring-urged into an angular position in relation to said control disc in which angular position said locking member is in said rest position.

32. The device according to claim 15, wherein said first housing teeth and said second housing teeth have the same tooth spacing.

33. The device according to claim 15, wherein said control disc and said locking disc have a relatively low inertial mass.

34. The device according to claim 15, furthermore comprising:

(l) peripheral teeth on said control disc, (m) a further locking member movably mounted on said housing, and (n) a further inertia body responding to predetermined accelerations of said automobile or the like for moving said further locking member into engagement with said peripheral control disc teeth to stop said control disc positively in a predetermined angular position with respect to said first housing teeth.

35. The device according to claim 34, wherein the common axis of rotation of said control disc, said locking disc and said reel spindle is inclined with respect to the horizontal plane of response of said further inertia body actuating said further locking member perpendicularly to the plane of response.

36. The device according to claim 35, wherein said further inertia body is a ball mounted in a saucer secured to said housing and said further locking member includes a horizontal arm resting on said ball and pivoted about a horizontal axis on said housing.

37. The device according to claim 34, wherein said peripheral control disc teeth are provided on the outside of a pot-shaped cover portion of said control disc which portion encloses said first housing teeth, said second housing teeth, said lateral locking disc teeth, said locking member or detent on the control disc and, where present, the separate inertia body on the control disc.

38. The device according to claim 34, wherein said first housing teeth and said peripheral control disc teeth have the same tooth spacing.

* * * * *